United States Patent Office 3,844,992
Patented Oct. 29, 1974

3,844,992
FAST CURE ORGANOPOLYSILOXANE RESINS
Robert C. Antonen, Midland, Mich., assignor to Dow Corning Corporation, Midland, Mich.
No Drawing. Filed Nov. 16, 1973, Ser. No. 416,466
Int. Cl. C08f 19/14
U.S. Cl. 260—18 S    14 Claims

ABSTRACT OF THE DISCLOSURE

Organopolysiloxanes resins having a high phenyl content are rapidly cured by the platinum catalyzed addition of ≡SiH to ≡Si-vinyl. These resins find utility in molding compound formulations.

---

The present invention relates to an improved organopolysiloxane resin. More particularily, the invention relates to an organopolysiloxane resin which cures at a rapid rate.

Organopolysiloxane resins in which the substituent groups are methyl, phenyl and vinyl radicals are well known. Vinyl-functional resins which contain a hydrogen-functional siloxane are conventionally cured by the platinum catalyzed addition of the silicon bonded hydrogen atoms to the silicon bonded vinyl groups. The properties of these organopolysiloxane resins give them utility in a variety of products as coating compositions, casting resins, laminates, and molding compounds.

There has arisen a need for organosiloxane resins which cure more rapidly than those available at this time.

It is an object of this invention to provide a fast curing organopolysiloxane resin.

It is also an object of this invention to provide a fast curing organopolysiloxane resin capable of being used as a molding compound.

A further object of this invention is to provide a fast curing organopolysiloxane molding compound with properties comparable to those of the slower curing organopolysiloxane resins.

Other objects and advantages of this invention will become apparent upon reading the following disclosure and claims.

This invention relates to a curable organopolysiloxane consisting essentially of:

(A) an organopolysiloxane base copolymer consisting essentially of (1) 50 to 100 parts by weight of a random organopolysiloxane consisting essentially of 15 to 60 mol percent RViSiO units, 0 to 85 mol percent R$_2$SiO units, and 0 to 50 mol percent RSiO$_{1.5}$ units, in which R is methyl or phenyl, Vi is vinyl; the phenyl to silicon ratio being in the range of 0.85:1.0 to 1.75:1.0, the vinyl to silicon ratio being in the range of 0.15:1.0 to 0.6:1.0; and (2) 0 to 50 parts by weight of a block organopolysiloxane consisting essentially of (a) polymer blocks of the average structure (R$_2$SiO)$_x$ (RViSiO)$_y$ (RSiO$_{1.5}$)$_z$ in which R and Vi are defined above, the sum of $x+y+z$ has an average value of from 5 to 180 inclusive, at least 30 mol percent of block (a) being (CH$_3$)$_2$SiO units, $y$ has a value up to 30 mol percent of (a), $z$ has a value up to 10 mol percent of (a), and (b) polymer blocks of the average unit formula

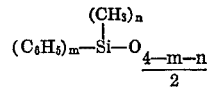

in which $m$ has an average value from 1 to 1.1 inclusive, $n$ has an average value up to 0.1 inclusive, the siloxane units in (a) being from 10 to 75 mol percent of block copolymer (2), polysiloxanes (1) and (2) having been separately rendered essentially free of hydroxyl groups; and (B) a hydrogen-functional organopolysiloxane of the formula

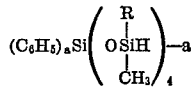

in which R is defined above, $a$ is 0 to 3 inclusive, at least one silicon atom in (B) being attached to a phenyl group, polysiloxane (B) being present in such an amount that the ratio of hydrogen atoms in (B) to vinyl groups in (A) is in the range of 0.8:1.0 to 1.5:1.0, and (C) a platinum catalyst.

In the above composition, organopolysiloxane (A) is the vinyl-functional base resin. This resin can be either wholly siloxane (1), which is a random copolymer, or it can be a mixture of (1) and (2), the latter being an organopolysiloxane block copolymer.

Organopolysiloxane (1) is a random copolymer of units selected from the group consisting of dimethylsiloxy units, methylphenylsiloxy units, diphenylsiloxy units, vinylmethylsiloxy units, vinylphenylsiloxy units, monomethylsiloxy units, and monophenylsiloxy units. Siloxane (1) can also contain minor amounts, less than 5 mol percent, of R$_3$SiO$_{0.5}$ units, ViR$_2$SiO$_{0.5}$ units, and SiO$_2$ units in which R and Vi are as previously defined.

Polysiloxane (1) is obtained by the hydrolysis of the corresponding organochlorosilanes. The resultant organosilanols are condensed in situ to organosiloxanes. These procedures are well known in the art.

In order to obtain the desired physical properties at rapid cure rates, organopolysiloxane (1) must contain sufficient phenyl substituents so that the ratio of phenyl groups to silicon atoms is in the range of 0.85:1.0 to 1.75:1.0; preferably from 0.9:1.0 to 1.2:1.0. The crosslinking potential of siloxane (1) supplied by the vinyl substituents on silicon must be such that the vinyl to silicon ratio is in the range of 0.15:1.0 to 0.6:1.0; preferably from 0.2:1.0 to 0.3:1.0

When organopolysiloxane (1) is the sole constituent of component (A), it is preferred that (1) consists essentially of 20 to 30 mol percent Vi(CH$_3$)SiO units, 35 to 45 mol percent C$_6$H$_5$SiO$_{1.5}$ units, and 30 to 40 mol percent (C$_6$H$_5$)$_2$SiO units.

Organopolysiloxane (2) is incorporated into the resin formulation when increased flexibility and resistance to thermal shock is desired The block copolymer can be present in an amount up to 50 parts by weight of a total 100 parts by weight of mixture (A). Optimum properties are obtained when the block copolymer (2) is present from 20 to 40 parts by weight of (A).

Organopolysiloxane block copolymers are known in the art and can be prepared by a number of methods. Details for their synthesis can be found in United States Pat. Nos. 3,280,214, 3,294,718, 3,328,481 and 3,436,439 which are hereby incorporated by reference.

The block copolymer (2) alternates a block which is at least 90 mol percent diorganosiloxy units with one that is at least 80 mol percent monophenylsiloxy units. The diorganosiloxy units of block (a) are selected from the same group as those listed above for siloxane (1). At least 30 mol percent of these units must be dimethylsiloxy units; preferably 55 to 85 mol percent, most preferably 65 to 75 mol percent. Block (a) also contains up to 30 mol percent RViSiO units, preferably 5 to 25 mol percent, most preferably 10 to 20 mol percent.

Block copolymer (2) must contain from 10 to 75 mol percent of block (a), preferably from 60 to 70 mol percent.

Organopolysiloxane block (b) must be at least 80 mol percent monophenylsiloxy units, preferably at least 90 mol percent.

It is preferred that organopolysiloxane (2) is present from 20 to 40 parts by weight of the total weight of (A). When organopolysiloxane (2) is present in this amount, it is preferred that (A) consists essentially of organopolysiloxane (1) as 25 to 35 mol percent $(C_6H_5)_2SiO$ units, 2 to 8 mol percent $(CH_3)_2SiO$ units, 20 to 30 mol percent $Vi(CH_3)SiO$ units and 35 to 45 mol percent $C_6H_5SiO_{1.5}$ units and organopolysiloxane (2) as 40 to 50 mol percent $(CH_3)_2SiO$ units, 5 to 15 mol percent $(C_6H_5)_2SiO$ units, 5 to 15 mol percent $Vi(CH_3)SiO$ units, and 30 to 40 mol percent $C_6H_5SiO_{1.5}$ units.

In order to obtain the desired fast cure, it is critical that organosiloxanes (1) and (2) are essentially free of hydroxyl groups. "Essentially free" is herein defined as less than 0.5 weight percent hydroxyl. These hydroxyl groups are bonded to silicon. They are produced during the hydrolysis of the organochlorosilanes. Small amounts remain after the polymerization process. Further removal of hydroxyl substituents may be effected by heating in the presence of a silanol ($\equiv$SiOH) condensation catalyst. This procedure is referred to as "bodying" the resin and is well known in the art. The result of bodying is a high molecular weight polymer with a low hydroxyl content. Known silanol condensation catalysts are numerous and include, for example, alkali metal hydroxides and salts, mineral acids, amines such as triethylamine, carboxylic acid salts of metals higher than hydrogen in the electromotive force series such as tin, lead, iron, and nickel, organotitanium compounds such as tetraethyltitanate, and alkali metal silanolates such as potassium silanolate. It is preferred that the condensation catalyst for organopolysiloxane (1) is selected from the group consisting of iron octoate and lead octoate, iron octoate being the most preferred. After heating in the presence of a condensation catalyst, the polymers range from high viscosity fluids to solids.

The hydrogen-functional organopolysiloxane (B) has the general formula

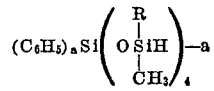

in which R is defined above and $a$ is 0 to 3 inclusive. These siloxanes are synthesized by hydrolysis of the corresponding chlorosilanes as taught in United States Patent Number 2,877,255. It is preferred that siloxane (B) be either

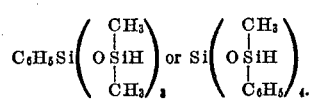

In order to assure a sufficient degree of cure, organopolysiloxane (B) must be present in an amount such that there are at least 0.8 mol silicon bonded hydrogen atoms for every mol of silicon bonded vinyl groups. In order to maintain the thermal stability of the resin, the ratio of $\equiv$SiH to $\equiv$SiVi must not exceed 1.5:1.0. It is preferred that the ratio of $\equiv$SiH to $\equiv$SiVi be in the range of 0.9:1.0 to 1.4:1.0.

The platinum catalyst can be in any of the known forms; for example, platinum metal, platinum deposited on carriers such as silica gel and powdered charcoal, platinic chlorides, salts of platinum, and chloroplatinic acid. Any of these forms will function as a catalyst in the compositions of this invention. Chloroplatinic acid, either as the commonly available hexahydrate or the anhydrous acid, is a preferred catalyst because it is readily dispersed in the siloxanes.

There should be at least 0.1 part by weight platinum per million parts by weight of the combined total weight of siloxanes (A) and (B). Since impurities in the system may poison small quantities of catalyst, it is preferred to employ from 1 to 20 parts by weight of platinum per million parts siloxane. A greater amount of platinum does not affect the reaction but economic considerations suggest usage within the stated limits.

These curable resins find utility in molding compound formulations. In common with normal practice in the art of silicone molding compounds, the compositions of this invention will contain an inorganic filler uniformly dispersed in the resin. Any of the numerous known fillers can be employed including, for example, quartz, amorphous silica, diatomaceous earths, glass, zirconium silicate, magnesium silicate, magnesium oxide, aluminum oxide, and calcium carbonate. Preferred fillers are glass fibers and amorphous silica.

The amount of filler can vary widely, depending on the desired physical properties of the molding compound. Generally molding compounds contain from 100 to 500 parts by weight filler per 100 parts by weight total resin.

In addition to one or more fillers, the compositions of this invention can contain other conventional ingredients, for example, pigments, preservatives, catalyst inhibitors, and release agents.

Resins of this invention also find utility as coating compositions, casting resins and laminates.

The following examples serve to illustrate the invention which is properly delineated in the claims.

In these examples, the resins were formulated into molding compounds on a two-roll mill using conventional procedures. The molding compounds were evaluated by molding test specimens using spiral flow and bar molds. The moldability was considered to be "satisfactory" if well consolidated, blister free specimens were obtained. It was rated as "good" when the specimens were rigid and easily removed from the hot mold. If the specimens were soft while hot but well consolidated, it was rated "flexible." Moldability was rated "poor" when the specimens were soft and easily damaged when removed from the mold.

In the following examples, the abbreviations Me, Ph and Vi refer to methyl, phenyl and vinyl radicals respectively.

Example 1

An organopolysiloxane resin consisting of 30 mol percent PhViSiO units, 35 mol percent $Ph_2SiO$ units and 35 mol percent $PhSiO_{1.5}$ units was synthesized by the hydrolysis and condensation of $PhViSiCl_2$, $Ph_2SiCl_2$ and $PhSiCl_3$. Iron octoate was added to one portion of the resin to obtain 0.05 weight percent Fe. The resin and catalyst were heated at 150° C. for 48 hours. To this bodied polymer was added sufficient

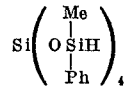

to provide 1 mol $\equiv$SiH per mole $\equiv$SiVi. to 50 parts by weight of this mixture were added and milled 150 parts by weight amorphous silica and sufficient chloroplatinic acid to supply 6 parts by weight platinum per million parts siloxane. The moldability of the above compound was determined on a ten ton transfer molding press by molding a 15 g. charge using a spiral mold at 800 p.s.i.

(0.562 g./cm.²) and 177° C. The minimum time necessary to obtain cure was 60 seconds, flow length was 38 inches (96.5 cm.). Moldability was rated "good." Test bars were molded on a ten ton transfer molding press using a 12 cavity bar molded at 177° C. and sufficient pressure to fill all cavities. Mold time was 60 seconds, flexural strength as molded was 4700 p.s.i. (272 kg./cm.²); after a 2 hour, 200° C. cure it was 9,117 p.s.i. (534 kg./cm.²).

For purposes of comparison, that portion of the base polymer which was not bodied was formulated into a molding compound exactly as above. This molding compound cured in three minutes. Moldability was rated "poor." It was not possible to measure the flexural strength of this unbodied sample due to the damage removal from the mold caused.

Example 2

A base polymer containing 35 mol percent PhViSiO units, 35 mol percent Ph₂SiO units, and 30 mol percent PhSiO₁.₅ units was synthesized by hydrolysis and polymerization of the corresponding chlorosilanes. A 70 weight percent solution of this polymer in toluene was refluxed 3 hours with sufficient iron octoate to supply 0.05 weight percent Fe. Water was removed by azeotropic distillation. A portion of this bodied polymer was mixed with sufficient

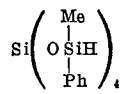

to supply 1.0 mol ≡SiH per mol ≡SiVi. A molding compound was formulated with this resin according to the procedure and proportions of Example 1. Minimum mold time on both the spiral and bar molds was 30 seconds. Flow length on the spiral mold was 14 inches (35.56 cm.). Moldability was rated "good." The as molded flexural strength of the bar mold specimen was 6,778 p.s.i. (392 kg./cm.²); after a 2 hour, 200° C. cure it was 9,775 p.s.i. (564 kg./cm.²).

A second portion of the above bodies polymer was mixed with sufficient

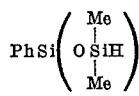

to supply 1 mol ≡SiH per mol ≡SiVi. A molding compound was formulated according to the procedure and proportions of Example 1. The minimum mold time for both the spiral and bar molds was 30 seconds. Flow length on the spiral mold was 16 inches (40.64 cm.). Moldability was rated "good." The as molded flexural strength of the bar mold specimen was 5,6933 p.s.i. (328 kg./cm.²); after a 2 hour, 200° C. cure it was 10,167 p.s.i. (588 kg./cm.²).

This example demonstrates that the use of crosslinking siloxanes in which R of the generic formula given previously is either methyl or phenyl gives equivalent results.

Example 3

A base polymer consisting of 40 mol percent PhViSiO units and 60 mol percent Ph₂SiO units was synthesized from the corresponding chlorosilane. This polymer was bodied by heating at 149° C. for 24 hours with sufficient lead octoates to supply 0.05 weight percent Pb. Sufficient

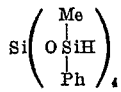

was added to the bodies polymer to supply 1 mol ≡SiH per mol ≡SiVi. A molding compound was formulated according to the procedure and proportions of Example 1. Minimum mold time in the spiral flow mold was 30 seconds. Flow length was 16 inches (40.64 cm.). Moldability was rated "flexible." Minimum mold time in the bar mold was 60 seconds. Flexural strength as molded was 3,007 p.s.i. (189 kg./cm.²); after a 2 hour, 200° C. cure it was 9,895 p.s.i. (572 kg./cm.²).

This example demonstrates the utility of polymers with a phenyl to silicon ratio of 1.6:1.0.

Example 4

A base polymer containing 25 mol percent MeViSiO units, 40 mol percent PhSiO₁.₅ units, and 35 mol percent Ph₂SiO units was bodied as a 50 weight percent toluene solution containing 0.05 weight percent Fe as iron octoate. This solution was refluxed 3 hours with water being removed by azeotropic distillation. The bodied polymer was mixed with sufficient

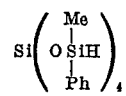

to supply 1.36 mol ≡SiH per mol ≡SiVi. A molding compound was prepared according to the procedure and proportions of Example 1 with the exception that 11 p.p.m. Pt were used. The compound cured in the spiral mold in 30 seconds, flow length was 25 inches (63.50 cm.). Moldability was rated as "good." The compound cured in the bar mold in 30 seconds. Flexural strength as molded was 7,852 p.s.i. (454 kg./cm.²); after a 2 hour 200° C. cure it was 10,405 p.s.i. (602 kg./cm.²).

Example 5

A 50 weight percent solution of a random copolymer consisting of 25 mol percent MeViSiO units, 40 mol percent PhSiO₁.₅ units, 30 mol percent Ph₂SiO units, and 5 mol percent Me₂SiO units in toluene was bodied by refluxing 5.5 hours in the presence of 0.05 weight percent Fe as iron octoate. Water was removed by azeotropic distillation. A 40 weight percent solution of a block copolymer consisting of 45 mol percent Me₂SiO units, 10 mol percent Ph₂SiO units, 10 mol percent MeViSiO units, and 35 mol percent PhSiO₁.₅ units in toluene was refluxed one hour in the presence of 0.1 weight percent potassium acetate. To a mixture of 70 parts by weight of the random copolymer and 30 parts by weight of the block copolymer was added sufficient

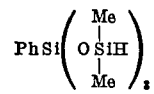

to supply 1.1 mol ≡SiH per mol ≡SiVi. To 50 parts by weight of the mixture of copolymers and hydrogen-functional siloxane were added and milled 88 parts by weight amorphous silica, 60 parts by weight glass fibers, 1 part by weight carbon black pigment, 0.5 part by weight calcium stearate release agent, and sufficient chloroplatinic acid to supply 11 p.p.m. Pt. Minimum cure time on both the spiral and bar molds was 30 seconds. Spiral flow length was 16 inches (40.64 cm.). Flexural strength as molded was 7,108 p.s.i. (409 kg./cm.²), after a 2 hour, 200° C. cure it was 8,918 p.s.i., (516 kg./cm.²).

This example demonstrates the ability to incorporate a block copolymer in the molding compound formulation without the loss of the rapid cure rate.

Example 6

A steel pin 0.250 inch diameter by 0.285 inch length (6.35 mm. x 7.24 mm.) was encapsulated with the molding compound of Example 4. Moldability was rated "good." The specimen did not crack after a 2 hour, 200° cure.

Another steel pin of the same dimensions was encapsulated with the molding compound of Example 5, which incorporated the block copolymer. Moldability was "good." The specimen did not crack after a 2 hour, 200° C. cure.

This example demonstrates that additional flexibility can be obtained by incorporating the block copolymer into the molding compound formulation.

That which is claimed is:

1. A curable organopolysiloxane resin consisting essentially of
   (A) an organopolysiloxane base copolymer consisting essentially of
      (1) 50 to 100 parts by weight of a random organopolysiloxane consisting essentially of 15 to 60 mol percent RViSiO units, 0 to 85 mol percent $R_2SiO$ units, and 0 to 50 mol percent $RSiO_{1.5}$ units,
      in which R is methyl or phenyl, Vi is vinyl; the phenyl to silicon ratio being in the range of 0.85:1.0 to 1.75:1.0, the vinyl to silicon ratio being in the range of 0.15:1.0 to 0.6:1.0; and
      (2) 0 to 50 parts by weight of a block organopolysiloxane consisting essentially of
         (a) polymer blocks of the average structure $(R_2SiO)_x(RViSiO)_y(RSiO_{1.5})_z$ in which R and Vi are defined above, the sum of $x+y+z$ has an average value of from 5 to 180 inclusive, at least 30 mol percent of block (a) being $(CH_3)_2SiO$ units, $y$ has a value up to 30 mol percent of (a), $z$ has a value up to 10 mol percent of (a), and
         (b) polymer blocks of the average unit formula

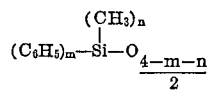

in which $m$ has an average value from 1 to 1.1 inclusive, $n$ has an average value up to 0.1 inclusive, the siloxane units in (a) being from 10 to 75 mol percent of block copolymer (2), polysiloxanes (1) and (2) having been separately rendered essentially free of hydroxyl groups; and
   (B) a hydrogen-functional organopolysiloxane of the formula

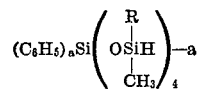

in which R is defined above, $a$ is 0 to 3 inclusive, at least one silicon atom in (B) being attached to a phenyl group, polysiloxane (B) being present in such an amount that the ratio of hydrogen atoms in (B) to vinyl groups in (A) is in the range of 0.8:1.0 to 1.5:1.0, and
   (C) at least 0.1 part by weight platinum per million parts by weight of the combined total weight of siloxanes (A) and (B).

2. A composition in accordance with Claim 1 in which, in component (A), polysiloxane (1) is rendered essentially free of hydroxyl groups by heating in the presence of a hydroxyl condensation catalyst selected from the group consisting of iron octoate and lead octoate.

3. A composition in accordance with Claim 2 in which the condensation catalyst is iron octoate.

4. A composition in accordance with Claim 2 in which component (A) is 100 parts by weight organopolysiloxane (1) and 0 parts by weight organopolysiloxane (2).

5. A composition in accordance with Claim 4 in which organopolysiloxane (1) is 20 to 30 mol percent $Vi(CH_3)SiO$ units, 35 to 45 mol percent $C_6H_5SiO$ units and 30 to 40 mol percent $(C_6H_5)_2SiO$ units.

6. A composition in accordance with Claim 2 in which component (A) is 60 to 80 parts by weight organopolysiloxane (1) and 20 to 40 parts by weight organopolysiloxane (2).

7. A composition in accordance with Claim 6 in which organopolysiloxane
   (1) is 25 to 35 mol percent $(C_6H_5)_2SiO$ units, 2 to 8 mol percent $(CH_3)_2SiO$ units, 20 to 30 mol percent $Vi(CH_3)SiO$ units, and 35 to 45 mol percent $C_6H_5SiO_{1.5}$ units, and
   (2) is 40 to 50 mol percent $(CH_3)_2SiO$ units, 5 to 15 mol percent $(C_6H_5)_2SiO$ units, 5 to 15 mol percent $Vi(CH_3)SiO$ units, and 30 to 40 mol percent $C_6H_5SiO_{1.5}$ units.

8. A composition in accordance with Claim 2 in which organopolysiloxane (B) is selected from the group consisting of $C_6H_5Si(OSi(CH_3)_2H)_3$ and

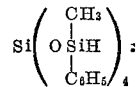

9. A composition in accordance with Claim 8 in which the ratio of hydrogen atoms in (B) to vinyl groups in (A) is in the range of 0.9:1.0 to 1.4:1.0.

10. A molding compound consisting essentially of
    (A) the organopolysiloxane resin in accordance with Claim 1, and
    (B) a solid inorganic filler uniformly dispersed in said resin.

11. A molding compound in accordance with Claim 10 in which the filler (B) is selected from the group consisting of amorphous silica and glass fibers.

12. The cured composition of Claim 1.

13. An article of manufacture comprising the cured molding compound of Claim 10.

14. A composition in accordance with Claim 1 in which component (C) is present in an amount from 1 to 20 parts by weight platinum per million parts by weight of the combined total weight of siloxanes (A) and (B).

References Cited
UNITED STATES PATENTS

| | | | |
|---|---|---|---|
| 3,527,842 | 9/1970 | Clark | 260—825 |
| 3,627,851 | 12/1971 | Brady | 260—825 |
| 3,635,874 | 1/1972 | Laur et al. | 260—825 |

MELVYN I. MARQUIS, Primary Examiner

U.S. Cl. X.R.

260—37 SB, 46.5 G, 46.5 UA, 825; 264—331

UNITED STATES PATENT AND TRADEMARK OFFICE
CERTIFICATE OF CORRECTION

PATENT NO. : 3,844,992
DATED : October 29, 1974
INVENTOR(S) : ROBERT C. ANTONEN

It is certified that error appears in the above-identified patent and that said Letters Patent are hereby corrected as shown below:

Column 2, line 15; column 3, line 52; and column 7, line 46

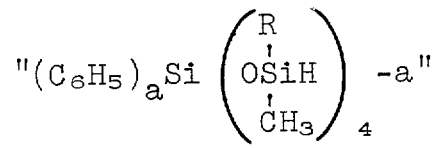

should read

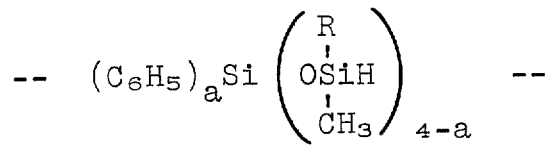

Signed and Sealed this twenty-third Day of December 1975

[SEAL]

Attest:

RUTH C. MASON
Attesting Officer

C. MARSHALL DANN
Commissioner of Patents and Trademarks